(12) United States Patent
Colby

(10) Patent No.: US 7,312,273 B1
(45) Date of Patent: Dec. 25, 2007

(54) HIGH GLOSS SEALER FOR PAINTED ART PIECES

(76) Inventor: Donald H. Colby, 272 Trailwood La., Northbrook, IL (US) 60062

( * ) Notice: Subject to any disclaimer, the term of this patent is extended or adjusted under 35 U.S.C. 154(b) by 326 days.

(21) Appl. No.: 10/979,311

(22) Filed: Nov. 2, 2004

(51) Int. Cl.
*C09D 133/08* (2006.01)
*C08G 73/10* (2006.01)

(52) U.S. Cl. ...................... 524/556; 524/376

(58) Field of Classification Search ................ 524/556
See application file for complete search history.

(56) References Cited

U.S. PATENT DOCUMENTS

| | | | |
|---|---|---|---|
| 4,598,118 A * | 7/1986 | Hansen et al. | 524/517 |
| 5,160,766 A * | 11/1992 | Waltrip et al. | 427/384 |
| 6,103,788 A * | 8/2000 | Harui et al. | 523/403 |
| 6,191,211 B1 * | 2/2001 | Mussell et al. | 524/555 |
| 2005/0027079 A1 * | 2/2005 | Palmer Lauer et al. | 525/244 |

* cited by examiner

*Primary Examiner*—David W. Wu
*Assistant Examiner*—Karuna Reddy
(74) *Attorney, Agent, or Firm*—McCracken & Frank LLP

(57) ABSTRACT

An improved coating composition for use in providing a glossy finish to various objects comprises from about 80 to about 92 percent by weight of an acrylic emulsion polymer; and from about 5 to about 12 percent of a glycol ether. The composition also includes from about 1 to about 3 percent by weight of a polyethylene wax emulsion; up to about 1% by weight petroleum distillate; and the balance is water. About 3 to about 5 parts by volume of the concentrate is mixed with from about 2 to about 4 parts by volume of water. The composition is sprayed onto the object to be coated.

1 Claim, No Drawings

HIGH GLOSS SEALER FOR PAINTED ART PIECES

CROSS REFERENCE TO RELATED APPLICATIONS

Not applicable

REFERENCE REGARDING FEDERALLY SPONSORED RESEARCH OR DEVELOPMENT

Not applicable

SEQUENTIAL LISTING

Not applicable

BACKGROUND OF THE INVENTION

1. Field of the Invention

This invention relates to water based coating and sealing compositions primarily for use in sealing and coating art pieces, such as plaster and ceramic art pieces. More particularly, this invention relates to a sealing and coating composition that air-dries to a high gloss.

2. Description of the Background of the Invention

There is a need in the area of consumer applied sealers and glazing compositions to have a composition that is water based, low odor and non-toxic. Many art shops have areas that allow clients to prepare three dimensional art pieces. Often these pieces are prepared using plaster of Paris, uncured and cured ceramic pieces, wood items and the like. Before coating, these pieces can be porous, and the colors can be mottled and dull.

Currently available post applied coatings use high amounts of volatile components so that the coating will dry quickly and the customer can take the completed work home without a return trip to the studio or shop. While these materials enable the compositions to dry more quickly, they also present potential health and safety issues. For instance, the presence of a high concentration of volatile petroleum based products and solvents can create inhalation issues, potential fire risk, and explosion hazards. Because of the high percentage of volatile materials, these compositions must be used in well ventilated areas that require a high investment in exhaust fans, explosion proof motors, and the like and the areas often must be separate from other areas in the store or studio. Less expensive fans need to be close to the work area, often within a few feet. These fans are often not explosion proof and can ignite a fire or explosion if there is a motor failure or other cause of sparking.

Another alternative is the use of aerosol-based products. To get a quick dry time, there needs to be a high percentage of volatile material in the aerosol spray composition. As such these spray lacquers also need to be used in a well ventilated area and the products still require a significant time to dry. In addition, these products tend to give off an odor of solvent for a number of hours after the product is dry to the touch. This is often objectionable to the customer. In addition, aerosol products should not be used by younger children who may not be as careful with the product as an adult.

SUMMARY OF THE INVENTION

One embodiment of the present invention comprises a coating composition with from about 80 to about 92 percent by weight of an acrylic emulsion polymer; and from about 5 to about 12 percent of a glycol ether. The composition also includes from about 1 to about 3 percent by weight of a polyethylene wax emulsion; up to about 1% by weight petroleum distillate; and the balance is water.

A further embodiment of the present invention is directed to a sprayable composition that comprises from 3 to 5 parts by volume of a concentrate coating composition containing from about 80 to about 92 percent by weight of an acrylic emulsion polymer; and from about 5 to about 12 percent of a glycol ether. The concentrate also includes from about 1 to about 3 percent by weight of a polyethylene wax emulsion; up to about 1% by weight petroleum distillate; and the balance is water. The sprayable composition also includes from 2 to 4 parts by volume of water.

A still further embodiment of the present invention is directed toward a method that has the steps of spraying an aqueous coating composition from a pump spray device onto a surface to be coated; and air drying the coating for at least one minute. The sprayable composition includes comprises from 3 to 5 parts by volume of a concentrate coating composition containing from about 80 to about 92 percent by weight of an acrylic emulsion polymer; and from about 5 to about 12 percent of a glycol ether. The concentrate also includes from about 1 to about 3 percent by weight of a polyethylene wax emulsion; up to about 1 percent by weight of a petroleum distillate; and the balance is water. The sprayable composition also includes from 2 to 4 parts by volume of water.

DETAILED DESCRIPTION OF THE PREFERRED EMBODIMENTS

The concentrate coating composition of the present invention includes five main components in an aqueous composition. The five components are: from about 80 to 92 percent by weight of an acrylic emulsion polymer, from about 5 to about 12 percent by weight of a glycol ether; from about 1 to about 3 percent by weight of a polyethylene wax emulsion; up to about 1 percent by weight of a petroleum distillate, and the balance is water. This concentrate composition is readily diluted by adding water to form a final sprayable composition. Other minor ingredients such as preservatives and the like can also be added.

The primary component of the coating concentrate of one embodiment of the present invention is an acrylic emulsion polymer. This acrylic emulsion polymer is present in the concentrate in an amount of from about 80 to about 92 percent by weight of the concentrate composition. Suitable acrylic emulsion polymers include: various acrylic emulsion polymers, available from Johnson Polymer Inc., Racine, Wis., under the name Joncryl®, such as Joncryl 537, Joncryl 538, and Joncryl 1532, and the Primal® polymers, available from Rohm and Haas. These emulsion polymers are typically provided as emulsions containing from about 15 to about 40 percent by weight polymer solids. The balance is typically primarily water and surfactant. It has been found that acrylic emulsion polymers that have a weight average molecular weight of less than about 100,000 weight average are most suitable, and preferably acrylic emulsion polymers with a weight average molecular weight of less than about 50,000 weight average molecular weight.

A second main component is a glycol ether solvent. These solvents are generally miscible with water and are quick to dry. They also have relatively low flammability. Typical glycol ethers include of dipropylene glycol N-butyl ether, diethylene glycol methyl ether, and mixtures thereof. Other similar glycol ethers can also be used. The glycol ether solvent is typically present in one embodiment of the concentrate within the range of from about 5 to about 12 percent by weight. One preferred blend of glycol ether solvents includes about 7 percent dipropylene glycol N-butyl ether and about 3 percent of diethylene glycol methyl ether.

The concentrate also includes a polyethylene wax emulsion. Typical useful polyethylene wax emulsions are described as having a small particle size. These materials include Jonwax 26, Jonwax 28 and Jonwax 39, available from Johnson Polymer, Inc., Racine, Wis., and Aquatec 4111, available from Eastman Chemical, Kingsport, Tenn. In one embodiment the polyethylene wax emulsion is present in an amount of from about 1 to about 3 percent by weight. These wax emulsions are typically sold as compositions having from about 20 to about 50 polymer solids.

The composition also includes in one embodiment a small amount of a hydrocarbon solvent. Typical solvents include materials sold under the tradename Isopar V, from Exxon-Mobil Chemical, Houston, Tex. This is described as a complex combination of hydrocarbons obtained by treating a petroleum fraction with hydrogen in the presence of a catalyst. It consists of hydrocarbons having carbon numbers predominantly in the range of C11 through C25, with the average about 17 carbon atoms, and boiling in the range of approx 490 to 625 degrees F. (initial boiling point to dry point). The hydrocarbon solvent is present in one embodiment in an amount of up to about 1 percent by weight.

The balance of the concentrate is made up of water and other minor components. These minor components include materials such as preservatives to prevent bacterial growth, fragrances, coloring agents, UV absorbers, and similar components. These minor components are typically present in the concentrate in an amount of up to about 2 percent by weight combined. The water can be either ordinary tap water or can be di-ionized water. Typical amounts of water added are between about 6 to about 14 percent by weight.

The concentrate in one embodiment is designed to be diluted with water shortly before use. Typical dilutions are done by mixing from about 3 to about 5 parts by volume of the concentrate with about 2 to about 4 parts by volume of water. A preferred embodiment includes about 4 parts by volume of concentrate and about 3 parts by volume of water. The sprayable composition is preferably prepared by mixing the concentrate and the water using gentle stirring to minimize the inclusion of air bubbles in the final composition.

The sprayable composition is sprayed onto the surface using a pump sprayer or using a air pressure sprayer. Typical pump sprayers include trigger spray bottles that are commercially available or finger pump bottles. If desired the composition can be sprayed on using a low volume air pressure. After the composition is sprayed onto the surface, the object is allowed to air dry for about 1 minute. At this time the compositions have dried to be dry to the touch although final curing or hardening can take up to 1 to 24 hours.

The compositions can be used to decorate various art and craft projects including painted and unpainted plaster of Paris objects, painted and unpainted ceramic objects, painted and unpainted wood objects, paper collages, and the like.

EXAMPLE

A concentrate composition having the following composition is prepared by mixing all the components together in a contained with gentile heat and stirring.

| Component | Percent by weight |
| --- | --- |
| Acrylic emulsion polymer | 90.0% |
| Dipropylene glycol N-butyl ether | 7.0% |
| Diethylene glycol methyl ether | 3.0% |
| Polyethylene wax emulsion | 2.0% |
| Hydrotreated middle petroleum distillate | 0.5% |
| Methly triaza-1-azoniatricyclodecane | 0.4% |
| 2-(4-thiazoly) benzimidazole | 0.03% |
| Water | Balance |

The above concentrate can be stored until needed. Shortly before use as a sprayable coating composition, 4 parts by volume of the concentrate are mixed with 3 parts by volume of water. The water is warmed to about 110 degrees F. to assist dispersion and the concentrate and water are mixed by stirring/the mixture gently to avoid the inclusion of air bubbles. The final composition is places into a trigger spray bottle and the composition is sprayed onto a hand painted plaster of Paris object until the surface of the object appears to be completely wet. The object is then allowed to air dry for 1 minute after which time it could be handled without damaging the finish. The object had a hard glossy finish that became water resistant after curing for about 1 day.

I claim:

1. A method of coating a surface of an art object comprises the steps of;

spraying an aqueous coating composition from a pump sprayer onto the surface to be coated; and air drying the coating for about one minute; wherein the coating is dry to the touch, and wherein the aqueous coating composition consists essentially of 4 parts by volume of a concentrate consisting essentially of from 80 to 92 percent by weight of an acrylic emulsion polymer having a weight average molecular weight of less than 100,000;

from 5 to 12 percent of a mixture of dipropylene glycol N-butyl ether and diethylene glycol methyl ether;

from 1 to 3 percent by weight of a polyethylene wax emulsion;

up to 1% by weight petroleum distillate; and the balance water; and 3 parts by volume of water.

* * * * *